Sept. 4, 1962 J. B. REICHERT 3,052,430
METHOD OF AERODYNAMICALLY DECELERATING
AN AIRCRAFT ON THE GROUND
Filed Feb. 2, 1960 2 Sheets-Sheet 1
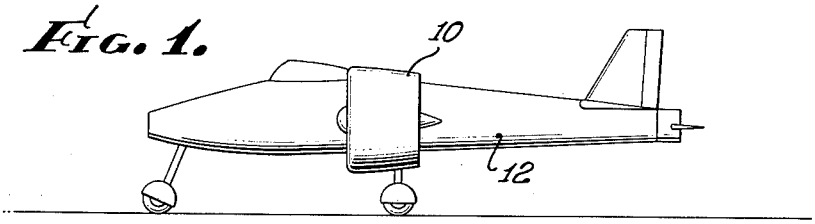
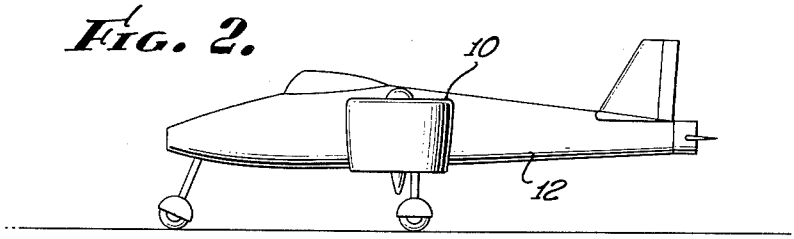
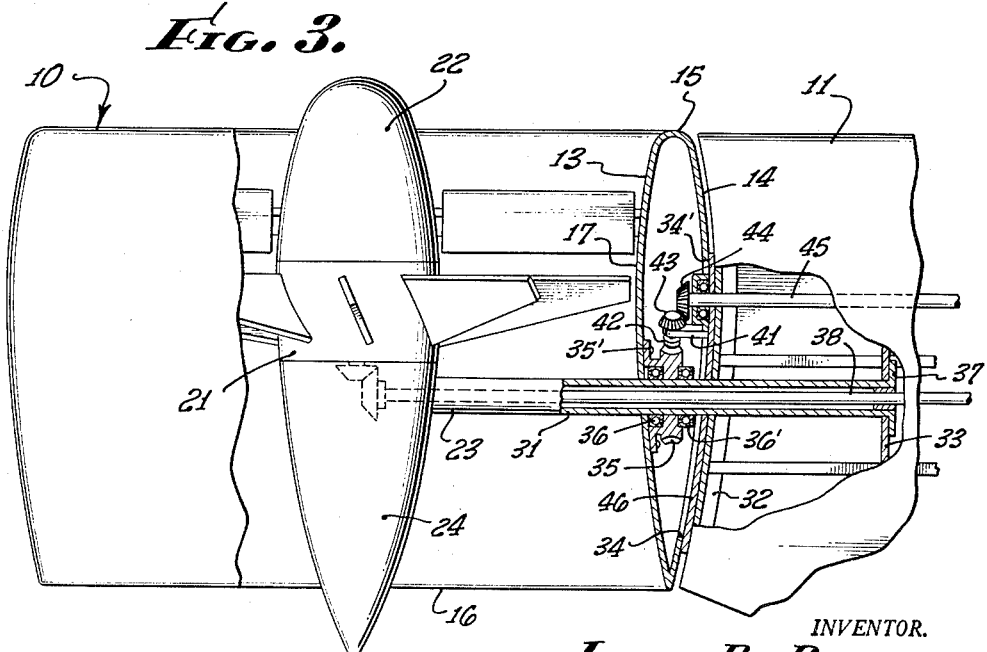
INVENTOR.
JAMES B. REICHERT
BY
Miketta and Glenny
ATTORNEYS.

Sept. 4, 1962 J. B. REICHERT 3,052,430
METHOD OF AERODYNAMICALLY DECELERATING
AN AIRCRAFT ON THE GROUND
Filed Feb. 2, 1960 2 Sheets-Sheet 2
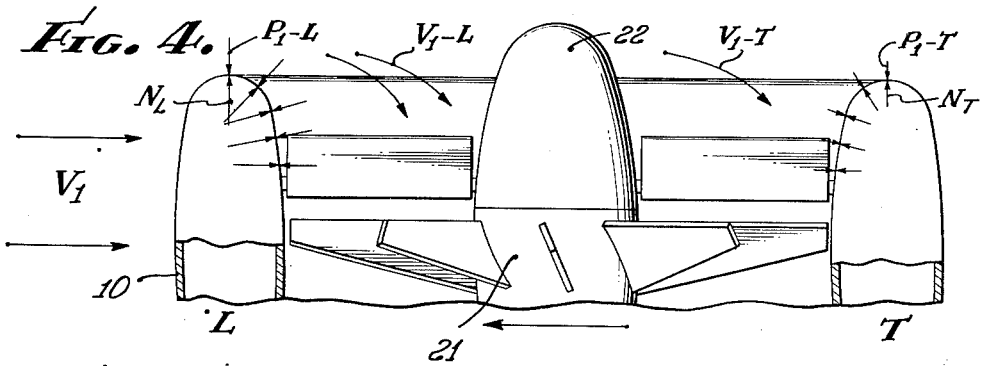
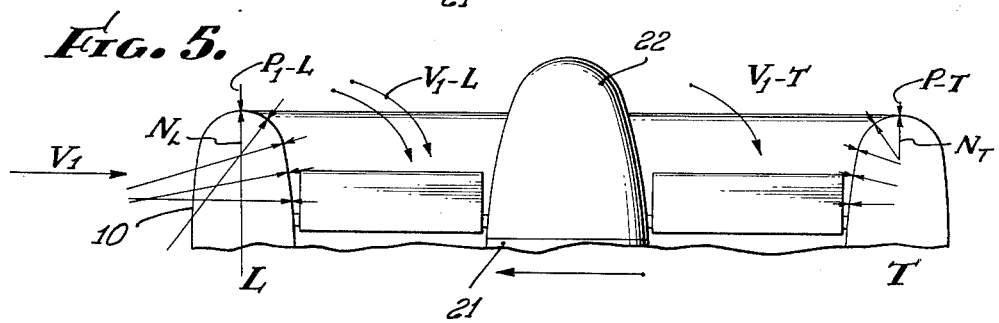
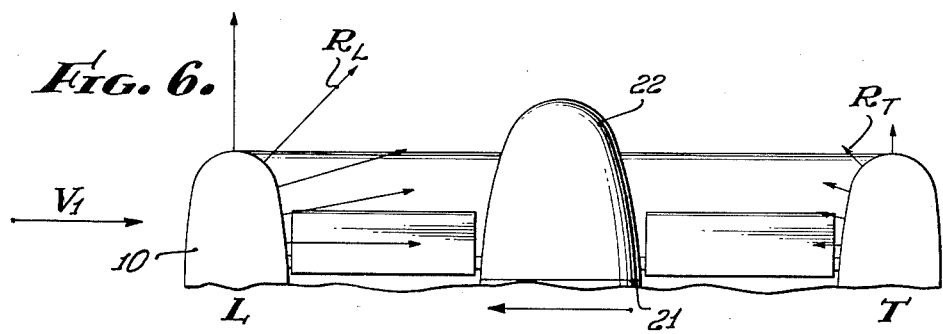
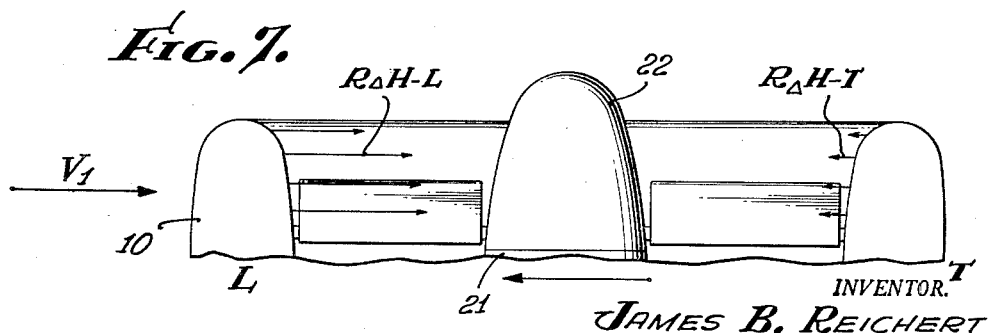
INVENTOR.
JAMES B. REICHERT
BY
Miketta and Glenny
ATTORNEYS.

United States Patent Office 3,052,430
Patented Sept. 4, 1962

3,052,430
METHOD OF AERODYNAMICALLY DECELERATING AN AIRCRAFT ON THE GROUND
James B. Reichert, Los Angeles, Calif., assignor, by mesne assignments, to Edmond R. Doak, Los Angeles, Calif.
Filed Feb. 2, 1960, Ser. No. 6,128
7 Claims. (Cl. 244—110)

This invention relates to a method of aerodynamically decelerating a craft having a rotatably mounted thrust-producing unit, and is considered to be unprecedented in the prior art.

It is foreseeable that greater utilization will be made of a thrust-producing unit which is rotatably mounted on a craft. Heretofore, a vertical take-off aircraft having a rotatably mounted thrust-producing unit at the extremity of each wing has been built, successfully flight tested, and disclosed in application Serial No. 472,313, filed December 1, 1954, now abandoned, by Edmond R. Doak, and its continuation application Serial No. 780,164, now Patent No. 2,961,189. The rotatable units are movable between horizontal and vertical positions and include a duct having a thrust-generating means axially located therein and the forward or intake surface being gradually convexly curved into confluent relation to the inner surface of the duct.

On this vertical take-off aircraft and on any other craft adapted to move in air or over land or water and having a rotatably mounted thrust-producing unit, the present invention may be utilized to decelerate the craft aerodynamically without the use of the standard braking equipment generally associated with such a craft.

The present invention uses the negative pressure created by the flow of air over the forward or intake surface of the thrust-producing unit to achieve aerodynamic deceleration. Such negative pressure opposes the static pressure of the moving air over the surface, as will be described in detail hereinafter. When a craft is moving horizontally with its thrust-producing unit in a substantially horizontal position, the present method for aerodynamically decelerating the craft is to rotate the unit into a substantially vertical position and substantially increase the thrust of the unit. With the unit in the vertical position, air flow over the leading intake surface of the duct is greater and at a higher velocity than over the trailing intake surface. Therefore, the static pressure is less and the negative pressure is greater at the leading intake surface than at the trailing intake surface. This unbalancing of negative pressure aerodynamically decelerates the craft without the aid of a standard braking system.

The present invention effectively extends the life of the brakes on a craft, and such brakes need only be used in taxiing or to completely stop the craft. However, it should be understood that the present invention may also be used on the ground or water when the craft is taxiing.

An object of the present invention is to provide a completely novel method of aerodynamically decelerating a craft.

Another object is to provide a method of areodynamically decelerating a craft having a rotatably mounted thrust-producing unit.

A further object is to provide a method of aerodynamically decelerating a craft having a rotatably mounted thrust-producing unit by utilizing the negative pressure at the intake surface of the duct.

Other objects and advantages of this invention will be readily apparent from the following description when considered in connection with the appended drawings.

In the drawings:

FIG. 1 is an exemplary craft carrying a rotatably mounted thrust-producing unit which is in a horizontal position;

FIG. 2 shows the exemplary craft of FIG. 1 with its thrust-producing unit rotated into a substantially vertical position to enable the craft to be aerodynamically decelerated in accordance with the present invention;

FIG. 3 is a side elevational view, partly in section, of the exemplary thrust-producing unit of FIGS. 1 and 2, in the horizontal position;

FIG. 4 is a diagrammatic representation of the pressures acting on the frontal or intake surface of the unit in FIG. 3 when the thrust-generating means (impeller) is at substantially less than full power and the velocity ($V_1$) of the airstream over the intake surface creates a static pressure ($P_1$) and negative pressure (N);

FIG. 5 is a diagrammatic view similar to FIG. 4 wherein the thrust-generating means (impeller) is at full power and the velocity ($V_1$) of the airstream over the intake surfaces has increased, causing the static pressure ($P_1$) to decrease and the negative pressure (N) to increase;

FIG. 6 is similar to FIGS. 4 and 5 and shows the resulting effective negative pressures or forces (R) at both the trailing and leading edges of the vertically positioned unit;

FIG. 7 is similar to FIGS. 4 to 6 and shows the effective horizontal components (R$\Delta$H) of the effective resultant negative pressures or forces (R) of FIG. 6, the horizontal components (R$\Delta$HL) at the leading edge of the unit greatly exceeding the horizontal components (R$\Delta$H—T) at the trailing edge of the unit.

To understand the term "negative pressure" as used in connection with the present invention, it is desirable to make use of various principles and scientific laws and formulae. And without being limited thereto, these principles will be compared and explained in connection with a vertical take-off aircraft having rotatable thrust units carried at the lateral extremity of its wings, this type of aircraft being broadly shown in FIGS. 1 and 2 and more specifically described in said applications Serial Nos. 472,313 and 780,164. The thrust-producing unit of said vertical aircraft comprises a duct having a driven bladed impeller rotatably mounted about a thrust axis (the tips of the blades being in close proximity to the inner surface of the duct), the forward or intake surfaces of the duct being relatively blunt and gradually convexly curving into confluent relation to the inner surface of the duct proper.

The present invention has been found to be particularly advantageous on said vertical take-off aircraft when the aircraft is overloaded and it is necessary to land with the thrust-producing ducts in the horizontal position rather than in the vertical position. The aircraft then has relative horizontal movement with the ground and the lift produced by the wings aids in landing the overloaded aircraft. The present invention may therefore be used to aerodynamically decelerate the overloaded aircraft without having to apply the brakes of the aircraft and without changing the direction of the craft.

Negative pressure can best be understood when the aircraft and its ducted thrust units have no forward speed or are in the vertical or hovering position. This may be described as having the aircraft in a "static conditioning." When the thrust-generating means (fan or impeller) within the ducts is stationary or rotating at a very low speed, there is a total fluid pressure acting on the surfaces of the duct. This total pressure may be designated as $P_2$ and equals the static pressure $P_1$ at the surface of the duct plus the dynamic pressure.

$$P_2 = P_1 + \tfrac{1}{2}\rho V_1^2$$

(total pressure)  (static pressure)  (dynamic pressure)

The dynamic pressure is equal to $\frac{1}{2}\rho V_1^2$, where $\rho$ is the density of the fluid and $V_1$ is the velocity of the fluid. In the "static condition," when the impeller is stationary or substantially so, the fluid velocity $V_1$ is zero and there is no dynamic pressure. Therefore, the total pressure $P_2$ of the fluid is equal to its static pressure $P_1$.

Use is now made of Newton's third law of nature where every force results from the interaction of two bodies. The two bodies experience equal forces, but in opposite directions. The two bodies here are the fluid and the duct surface. This, then, means that at each point on the surface of the duct there is an equal and opposite pressure being exerted by the surface of the duct against the "total pressure" $P_2$.

When the fluid is given a velocity $V_1$ and placed into motion, the total pressure $P_2$ is constant and still equals the static pressure $P_1$ plus the dynamic pressure ($\frac{1}{2}\rho V_1^2$). Therefore, the static pressure $P_1$ of said fluid is reduced to enable the total pressure $P_2$ to remain constant, this being well established in Bernoulli's Theorem as applied to venturi nozzles and the like. The greater the velocity $V_1$ over any portion of the surfaces of the duct, the lower the static pressure $P_1$ becomes at such duct surface portion.

The "static pressure" $P_1$ of the moving fluid at a point on the surface of the duct or within the fluid can be formally defined as the mean of the normal components of stress on three mutually perpendicular planes of the surface at that point, at rest relative to the fluid. Therefore, there is "static pressure" at each point along the surface of the duct and at each of said points there is an opposite pressure N being exerted by the surface of the duct which balanced the total pressure $P_2$ of the fluid exerted on each point when the fluid was motionless or had zero velocity. This opposite force N can be referred to a "negative pressure."

For clarity, only a single point along the surface of the duct will be considered. There is a static pressure $P_1$ of the fluid being exerted inwardly at this point on the duct surface and there is a "negative pressure" N being exerted outwardly at this point by the duct surface. Since static pressure acts perpendicular to the laminar flow path of the fluid, it is acting perpendicular to the surface of the duct at this point.

When the velocity $V_1$ of the fluid increases it can be seen from the basic formula $$(P_2 = P_1 + \frac{1}{2}\rho V_1^2)$$

that to maintain a constant total pressure $P_2$, the static pressure $P_1$ decreases. Therefore, at each point on the surface of the duct, there is a greater "negative pressure" N being exerted outwardly than there is static pressure $P_1$ being exerted inwardly. When a duct capable of generating thrust is in the vertical position and is stationary with respect to the ground, the "negative pressure" at the leading edge portion of the intake surface of the duct is equal to the "negative pressure" at the trailing edge portion of the intake surface of the duct. Therefore, the horizontal components of the negative pressures at points on the leading edge portion of the intake surface and the trailing edge portion of the intake surface are balanced and there is no deceleration effect.

However, when a duct capable of generating thrust is in the vertical position and is moving horizontally with respect to the ground, there is air flowing over the intake surfaces of the duct with a velocity $V_1$ and the negative pressures are unbalanced at the leading and trailing edge portions of the intake. It will be understood that the velocity of the air entering the duct and flowing over the leading edge portion of the intake surface of the duct is substantially greater than at the trailing edge portion of the intake surface. In accordance with the above discussion, the "negative pressure" and its horizontal components are therefore greater at the leading edge portion of the intake surface than at the trailing edge portion of the intake surface. This unbalanced condition of the horizontal components of the negative pressures at the leading edge portion and the trailing edge portion of the intake surfaces has a tendency to decelerate the duct and aircraft carrying the duct. This deceleration effect varies with the velocity of the air over the intake surfaces and depends upon the relative speed of the craft with respect to the ground and the power of the thrust-generating means (impeller) within the thrust unit. The greater the landing speed of the craft and the thrust of the unit, the greater the deceleration effect.

It is believed that this is the first instance where "negative pressure" has been used to aerodynamically decelerate a craft. While the invention will be described in connection with the vertical take-off aircraft described hereinbefore, it is understood that other air, water or ground craft may utilize this invention.

In FIGS. 1 to 3, it can be seen that a thrust-propulsion unit 10 may be rotatably carried at the lateral extremity of a wing 11 of a vertical take-off aircraft 12, it being understood that a like unit 10' is carried at the extremity of the other wing of the aircraft 12. The unit 10 may be an open-ended tubular duct having a wall or shroud of airfoil cross-section presenting a smooth, inner, tubular surface 13 and an outer surface 14, these two surfaces merging to form a blunt frontal or intake surface 15 and exhaust surface 16. The inner surface, in effect, converges to provide a throat 17 of smaller diameter than and spaced rearwardly from the intake surface 15. The throat 17 may be located in a zone from about 20% to 60% of the total length of such duct from the intake surface 15.

A thrust-generating means 21 is axially located within the duct 10 and preferably is a multi-bladed fan or impeller rotatably carried by a hub 22 and adapted to rotate about the thrust axis of the duct. A spider or a series of spaced radial hollow supports 23 may be attached to the trailing portion 24 of the hub and to the inner walls of the duct to maintain the blade assembly in proper position within the duct.

Means are provided for imparting rotation to the multi-bladed fan 21 within each of the propulsion units 10 and for imparting controllable rotation to such units for the purpose of moving the units between a substantially horizontally position (FIG. 1) and substantially vertical position (FIG. 2). In the exemplary craft in FIG. 3, a stationary, hollow, tubular trunnion shaft 31 may be rigidly mounted with respect to the wing 11 and extends outwardly therefrom beyond the tip thereof and is rigidly connected to the stationary, trailing portion 24 of the hub. The wing 11 may be provided with spaced ribs 32 and 33 which are adapted to rigidly support the inner end of the hollow trunnion 31 in any suitable manner. The external surface of the unit 10 may be provided with a circular aperture (defined by the edges 34 and 34') surrounding the hollow trunnion shaft 31 but spaced therefrom. Within the wall of the shroud of the propulsion unit 10 there is securely mounted a worm wheel 35, the trunnion shaft 31 extending therethrough. Suitable radial and thrust bearings 36 and 36' may be carried between the trunnion shaft 31 and the hub of the worm wheel 35, a stop ring 37 being carried by the trunnion shaft 31 so as to prevent axial displacement of the propulsion unit 10 with respect to the shaft.

Extending through the hollow trunnion shaft 31 is a fan drive shaft 38 which is understood to be operatively connected to a suitable main power plant located within the fuselage for driving the multi-bladed fan 21. It is understood that a complementary drive shaft extends from the main power plant (not shown) to the other propulsion unit 10' located on the other side of the longitudinal axis of the aircraft. The single power plant therefore provides driving power for both of the multi-bladed fans located in the tubular ducts of the propulsion units.

Means may be provided for controllably and partially rotating the unit 10 about the lateral axis of the aircraft or about the trunnion shaft 31. Extending outwardly from the terminal rib 32 is a bracket 41 in which is journaled a worm 42 engaging the worm wheel 35. The end of the worm shaft also carries a bevel gear 43 in engagement with a bevel gear 44 carried on the end of a rotational drive shaft 45 suitably journaled in bearings carried by the ribs of the wing. The drive shaft 45 extends into the fuselage of the aircraft and is adapted to be rotated by a separate motor. It can be seen that whenever the drive shaft 45 is rotated, the worm wheel 35 will be rotated by means of the beveled gears 43 and 44 and worm 42. Since the worm wheel 35 is rigidly connected to the shroud of the unit 10 (by any suitable means such as rivets 35') the entire propulsion unit 10 will be rotated upon the trunnion shaft 31.

It may be noted that the contour of the wing tip is preferably of a configuration approximating the curvature of the outer surface 14 of the unit 10 so that when the unit 10 is forwardly directed, very little space exists between the wing tip and the unit carried thereby. The circular opening (defined by the margins 34 and 34') formed in the external surface of the propulsion unit 10 is normally closed by a circular plate 46 and carried by the wing tip, sliding contact being made between the closure plate 46 and movable propulsion unit 10.

In order to aerodynamically decelerate in accordance with the present invention, the operation is as follows: With the craft in horizontal flight or having relative horizontal movement with the ground or water (FIG. 1) the thrust-propulsion unit 10 is rotated into a substantially vertical position (FIG. 2). When this occurs the impeller or thrust-generating means is not operating at full power as generally the craft is landing or is in a position where full thrust is not required. With the craft moving horizontally with respect to the ground and the unit 10 in the vertical position, an airstream having a velocity $V_1$, flows over and around the craft and duct 10. In this vertical position, duct 10 has a leading intake surface L over which an airstream flows into the duct with a velocity $V_1-L$ and a trailing intake surface T over which an airstream flows into the duct with a velocity $V_1-T$.

A greater quantity and higher velocity of air will flow over the leading intake surface L than the trailing intake surface T. Therefore, the basic formula of $$P_2 = P_1 + \tfrac{1}{2}\rho V_1^2$$

must be applied separately to the leading and trailing intake surfaces as there is a different total pressure ($P_2$) on each surface, $P_2-L$ being the total pressure at the leading intake surface L and $P_2-T$ being the total pressure at the trailing intake surface $T_1$.

As shown in FIG. 4, after the duct 10 has been rotated into the vertical position, the leading intake surface L has an airstream flowing over it with a velocity $V_1-L$ creating a static pressure $P_1-L$ which is opposed by a negative pressure $N_L$, and the trailing intake surface T has an airstream flowing over it with a velocity of $V_1-T$ creating a static pressure $P_1-T$ which is opposed by a negative pressure $N_T$. Since $V_1-L$ is greater than $V_1-T$, $P_1-L$ and $N_L$ are greater than $P_1-T$ and $N_T$, respectively. In addition, since there is an airstream over the intake surfaces, the static pressures $P_1-L$ and $P_1-T$ are less than the negaive pressures $N_L$ and $N_T$, respectively.

After the duct 10 has been rotated into the vertical position, the pilot applies substantially full power to the thrust-generating means 21 to draw as much air at the highest velocity over the intake surfaces and through the duct as possible. This is diagrammatically shown in FIG. 5, where substantially maximum power has been given to impeller 21 to increase $V_1-L$ and $V_1-T$. Since $P_2-L$ and $P_2-T$ remain constant, $P_1-L$ and $P_1-T$ decrease and $N_L$ and $N_T$ increase. It is understood that $V_1-L$ is substantially greater than $V_1-T$ as the air being drawn over the trailing intake surface T is opposed by the airstream having a velocity $V_1$. However, the airstream over the leading intake surface L tends to follow the curved inner surface 13 of the duct 10 and its velocity is not therefore decreased.

The resultant negative presure $R_L$ and $R_T$ (FIG. 6) are obtained by subtracting $P_1-L$ from $N_L$, and $P_1-T$ from $N_T$, respectively. This represents the resultant effective negative pressure and as diagrammatically shown in FIG. 6, each resultant negative pressure acts perpendicular to the surface of the duct 10 and each point on the surface has such a resultant negative pressure.

The horizontal components $R\Delta H-L$ and $R\Delta H-T$ of the resultants $R_L$ and $R_T$, respectively, are diagrammatically shown in FIG. 7 and are the forces which aerodynamically decelerate the craft. The total horizontal components of the leading intake surface ($R\Delta H-L$) greatly exceed the total of the horizontal components of the trailing intake surface ($R\Delta H-T$).

There is therefore an unbalancing of forces and a tendency for the total $R\Delta H-L$'s to act in the opposite direction of movement of the duct 10 and craft 12 and decelerate them.

It can therefore be understood that a method of aerodynamically decelerating a craft is disclosed herein without the use of the normal brakes adapted to be carried by an aircraft, boat or other craft. The present invention may be used on aircraft, boats or land craft with equal effectiveness. It has been found to be particularly adapted for use on the vertical take-off aircraft described above and in said application, for decelerating the craft when it has an excessive load and is required to land with a horizontal roll. The present invention allows such an aircraft to land within a substantially shorter landing field.

The deceleration effect of the present invention varies with the forward speed of the craft; the higher the forward speed the greater the deceleration effect. With a power of 10,000 pounds thrust for the thrust-producing units, it has been determined that a deceleration effect of up to 0.4 G (gravitational force) may be obtained with a forward speed of 50 knots, and 0.6 G with a forward speed of 70 knots.

Obviously, many modifications and variations of the present invention are possible in the light of the above teachings. It is therefore to be understood that within the scope of the appended claims the invention may be practiced otherwise than as specifically described.

I claim:

1. A method of aerodynamically decelerating a craft having a thrust-producing unit without changing the direction of the craft while on the ground including a relatively blunt intake surface and thrust-generating means therein and which is ratatably mounted about a transverse axis for selective positioning between horizontal and vertical, comprising the steps of: rotating the thrust-producing unit from a substantially horizontal position to a substantially vertical position while the craft is on and has relative horizontal movement with the ground; and substantially increasing the power of the thrust-generating means whereby the negative pressure at the leading edge of the moving substantially vertical units is unbalanced with and greater than the negative pressure at the trailing edge of the moving substantially vertical unit, causing deceleration of the craft.

2. A method of aerodynamically decelerating a craft having a thrust-producing unit without changing the direction of the craft while on the ground including an open-ended duct with a thrust-generating means located along the thrust axis of the duct, said duct being rotatably mounted about a lateral axis of said craft for movement from a substantially horizontal position to a substantially vertical position, comprising the steps of: rotating the duct from a substantially horizontal position to a substantially vertical position while the craft is on the ground, and substantially increasing the thrust produced by said thrust-generating means whereby the negative pressure at the leading intake surface of the vertical duct is substantially greater than at the trailing intake surface of the duct.

3. A method of aerodynamically decelerating a craft without the aid of additional braking means and without changing the direction of the craft while on the ground, comprising the steps of: rotating a thrust-producing ducted unit rotatably mounted about a lateral axis of the craft from substantially horizontal to substantially vertical while the craft is on the ground; and substantially increasing the thrust of said thrust-producing ducted unit to draw high velocity air over the intake surfaces of the ducted unit and create unbalancing negative pressures at the leading and trailing intake surfaces of the ducted unit to decelerate the craft.

4. A method of aerodynamically decelerating a craft having a rotatably mounted thrust-producing unit without changing the direction of the craft while on the ground, comprising the steps of: rotating the thrust-producing unit from a substantially horizontal position to a substantially vertical position while the craft is on the ground; and substantially increasing the thrust of said thrust-producing unit.

5. A method of aerodynamically decelerating a craft having a rotatably mounted thrust-producing unit without changing the direction of the craft while on the ground including a relatively blunt intake surface, comprising the steps of: rotating the thrust-producing unit from a substantially horizontal position to a substantially vertical position while the craft is on the ground; and substantially increasing the thrust of said thrust-producing unit to utilize the negative pressures at said intake surface to decelerate the craft.

6. A method of decelerating a craft having horizontal motion without changing the direction of the craft while on the ground, comprising the steps of: rotating a thrust producing ducted unit about an axis perpendicular to the direction of motion until the normal thrust axis is substantially perpendicular to the direction of motion while the craft is on the ground, and substantially increasing the thrust of said thrust producing unit.

7. A method of decelerating a craft having more than one rotatably mounted thrust producing ducted unit without changing the direction of the craft while on the ground, comprising: rotating each thrust producing unit from a forward direction to a direction substantially perpendicular to the direction of motion while the craft is on the ground and substantially increasing the thrust of each of said thrust producing units.

References Cited in the file of this patent

Interavia Magazine (Geneva, Switzerland), July 1958, pg. 696.